United States Patent
Blackmore et al.

(10) Patent No.: US 6,782,464 B2
(45) Date of Patent: Aug. 24, 2004

(54) MAPPING A LOGICAL ADDRESS TO A PLURALITY ON NON-LOGICAL ADDRESSES

(75) Inventors: Robert S. Blackmore, Poughkeepsie, NY (US); Radha R. Kandadai, Lake Katrine, NY (US); Chulho Kim, Poughkeepsie, NY (US); Gili Mendel, Cary, NC (US); Gautam H. Shah, Worcester, MA (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 09/906,860

(22) Filed: Jul. 17, 2001

(65) Prior Publication Data

US 2003/0018872 A1 Jan. 23, 2003

(51) Int. Cl.[7] .............................................. G06F 12/00
(52) U.S. Cl. ...................................... 711/202; 711/209
(58) Field of Search ................................ 711/202, 209, 711/214, 220

(56) References Cited

U.S. PATENT DOCUMENTS

| | | | |
|---|---|---|---|
| 4,769,770 A | | 9/1988 | Miyadera et al. ............ 364/200 |
| 4,833,603 A | | 5/1989 | Morganti et al. ............ 364/200 |
| 5,355,461 A | * | 10/1994 | Wakui et al. ................ 711/203 |
| 5,630,087 A | * | 5/1997 | Talluri et al. ................ 711/202 |
| 5,649,141 A | * | 7/1997 | Yamazaki .................... 711/206 |
| 5,784,706 A | * | 7/1998 | Oberlin et al. .............. 711/202 |
| 6,047,332 A | * | 4/2000 | Viswanathan et al. ...... 709/245 |
| 6,070,189 A | * | 5/2000 | Bender et al. ............... 709/224 |
| 6,111,894 A | * | 8/2000 | Bender et al. ............... 370/469 |
| 2002/0034178 A1 | * | 3/2002 | Schmidt et al. ............. 370/386 |

FOREIGN PATENT DOCUMENTS

JP           91345447          12/1991

OTHER PUBLICATIONS

K. Li. "Shared Virtual Memory on Loosely Coupled Multiprocessors". PhD Thesis, Department of Computer Science, Yale University, Sep. 1986.

W. Yu. C. Amza, A.L. Cox, S. Dwarkadas, P. Keleher, H. Lu, R. Rajamony and W. Zwaenepoel. "TreadMarks: Shared Memory Computing on Networks of Workstations". IEEE Computer, pp. 18–28, Feb. 1996.

U. Ramachandran, Y.A. Khalidi: An Implementation of Distributed Shared Memory, Software—Practice and Experience 21(5):443–464 (1991).

* cited by examiner

Primary Examiner—Reba I. Elmore
(74) Attorney, Agent, or Firm—Lawrence D. Cutter, Esq.; Blanche E. Schiller, Esq.; Heslin Rothenberg Farley & Mesiti P.C.

(57) ABSTRACT

Communication between different entities of a computing environment is facilitated by an address mapping capability. Messages are sent between the entities to have desired tasks performed. Instead of providing within the messages the actual non-logical addresses (e.g., virtual, real addresses) used to perform the tasks, logical addresses are provided. The logical addresses are then mapped to the non-logical addresses. Each logical address can map to a plurality of non-logical addresses.

87 Claims, 3 Drawing Sheets

MAPPING A LOGICAL ADDRESS TO A PLURALITY ON NON-LOGICAL ADDRESSES

TECHNICAL FIELD

This invention relates, in general, to processing within a computing environment, and in particular, to an address mapping capability that facilitates communication between entities of the computing environment.

BACKGROUND OF THE INVENTION

Processing within a computing environment necessitates the referencing of addresses of storage locations of the computing environment. These addresses may be used to perform a task, such as invoke processes or functions, store data at a particular location and/or obtain data from a location, as examples. Thus, it is imperative for an entity of the computing environment, such as an application, wishing to perform such a task to know the address associated with that task.

In some computing environments (e.g., in some single system environments), the addresses of particular storage locations are predefined, and this pre-definition is known to the entities. Thus, the entities know which addresses to reference for particular tasks. However, in other environments, the entities do not know of such a pre-definition and it is thus, more difficult to determine the appropriate addresses. This is particularly true for those systems (e.g., distributed systems) in which the addressing for the various nodes is different. For example, a particular function may be referenced by one address on one node, and yet, another address at another node.

In those types of systems, another mechanism is needed for obtaining the appropriate addresses. As one example, an address exchange is used in which the entities on the various systems exchange addresses prior to performing the task. For instance, if an application on Node A wishes to send a message to an application on Node B to invoke a function on Node B, then the application on Node A and the application on Node B communicate with one another to obtain the address for the function. After this exchange, then the application on Node A sends the application on Node B the message to invoke the function, wherein the message includes the appropriate address.

Although this type of exchange is more flexible than the pre-defining of addresses, it places an additional burden on the applications and on the computing environment. Thus, a need exists for a capability that facilitates communication between different entities of a computing environment. A further need exists for a capability that facilitates the referencing of addresses in order to perform tasks.

SUMMARY OF THE INVENTION

The shortcomings of the prior art are overcome and additional advantages are provided through the provision of a method of mapping addresses. The method includes, for instance, specifying a logical address, the logical address corresponding to a first non-logical address; and mapping the logical address to a second non-logical address, wherein the logical address corresponds to a plurality of non-logical addresses.

In a further embodiment, a method of mapping addresses is provided, which includes, for instance, receiving, by one entity of a computing environment from another entity of the computing environment, a message having a logical address, the logical address corresponding to a non-logical address usable by the one entity that is unknown to the another entity; and translating the logical address into the non-logical address usable by the one entity.

In yet a further embodiment, a method of mapping addresses is provided. The method includes, for instance, sending, from one operating system instance to another operating system instance, a message indicating a task to be performed, the message including a logical address associated with the task; determining, by a component of the another operating system instance, a non-logical address corresponding to the logical address; and using the non-logical address by the another operating system instance to facilitate execution of the task.

Advantageously, an address mapping capability is provided, which maps a logical address to a plurality of non-logical addresses. When an entity wishes to communicate with another entity and an address is to be referenced in the communication, a logical address is used. This logical address, which corresponds to a non-logical address of the sending entity, is translated by the receiving entity to another non-logical address. This other non-logical address may be the same or different than the non-logical address of the sending entity. In either case, the other non-logical address is unknown to the sending entity. Thus, communication between the entities is facilitated by not requiring the entities to know the addressing of one another.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, an address mapping capability is provided, in which an entity of a computing environment that needs to reference an address (e.g., a virtual or real address) associated with another entity of the computing environment, but does not know that address, references a logical address, instead. The logical address is then used to map to the unknown address.

Figure 1:
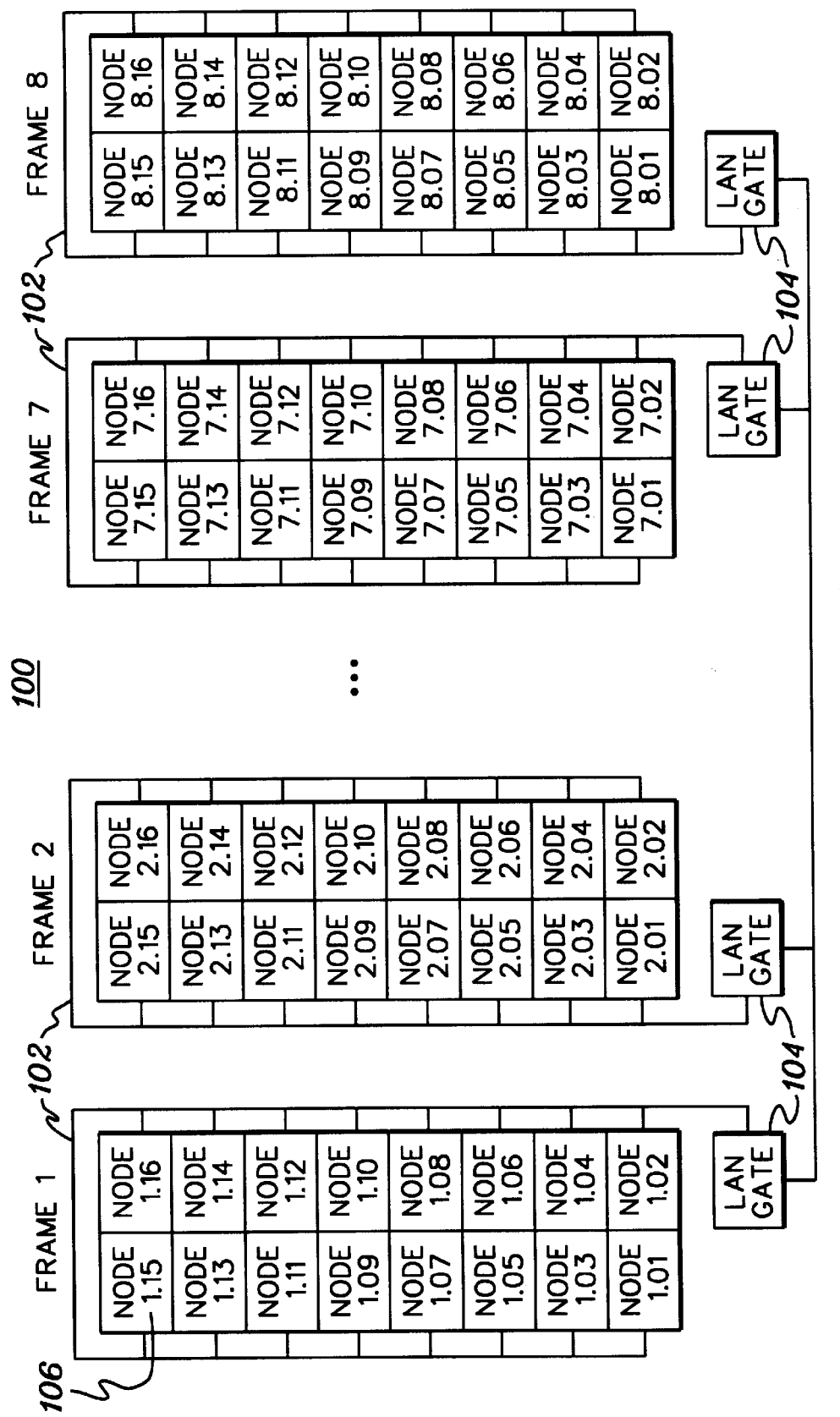
FIG. 1 depicts one embodiment of a computing environment incorporating and/or using one or more aspects of the present invention.

One embodiment of a computing environment incorporating and using aspects of the present invention is depicted in FIG. 1. As one example, the computing environment is a distributed computing environment 100 including, for instance, a plurality of frames 102 coupled to one another via a plurality of LAN gates 104. Frames 102 and LAN gates 104 are described in detail below.

As one example, distributed computing environment 100 includes eight frames, each of which includes a plurality of processing nodes 106. In one instance, each frame includes sixteen processing nodes (a.k.a., processors). Each processing node is, for instance, a RISC/6000 computer running AIX, a Unix based operating system. Each processing node within a frame is coupled to the other processing nodes of the frame via, for example, at least one internal LAN connection (e.g., an Ethernet; an SP switch offered by International Business Machines Corporation, Armonk, N.Y.; and/or other connections). Additionally, each frame is coupled to the other frames via LAN gates 104.

As examples, each LAN gate 104 includes either a RISC/6000 computer, any computer network connection to the LAN or a network router. However, these are only examples. It will be apparent to those skilled in the relevant art that there are other types of LAN gates and that other mechanisms can also be used to couple the frames to one another.

In one embodiment, entities within the computing environment (such as, operating system instances, applications, etc.) communicate with one another via a communications protocol. The communications protocol is considered herein as a component of an entity, and can be included within the entity itself or in, for instance, library code referenced by the entity. One example of such a communications protocol is the Low-Level Application Programming Interface (LAPI), offered by International Business Machines Corporation, Armonk, N.Y. LAPI is a one-sided communications protocol, in which there is no pairing of send and receive messages. LAPI is described in detail in, for instance: U.S. Pat. No. 6,070,189 entitled "Signaling Communication Events In A Computer Network", by Shah et al., issued May 30, 2000; U.S. Pat. No. 6,038,604 entitled "Method And Apparatus For Efficient Communications Using Active Messages", by Shah et al., issued Mar. 14, 2000; U.S. patent application entitled "Mechanisms For Efficient Message Passing With Copy Avoidance In A Distributed System Using Advanced Network Devices", by Blackmore et al., Ser. No. 09/619,051, filed Jul. 18, 2000; and U.S. patent application entitled "Efficient Protocol For Retransmit Logic In Reliable Zero Copy Message Transport", by Blackmore et al., Ser. No. 09/619,054, filed Jul. 18, 2000, each of which is hereby incorporated herein by reference in its entirety.

The distributed computing environment of FIG. 1 is only one example. It is possible to have more or less than eight frames, or more or less than sixteen nodes per frame. Further, the processing nodes do not have to be RISC/6000 computers running AIX. Some or all of the processing nodes can include different types of computers and/or different operating systems. Additionally, communications protocols, other than LAPI, may be used. All of the these variations are considered a part of the claimed invention.

Further, aspects of the invention are useful with other types of computing environments and other types of communications environments. For example, one or more aspects of the present invention are useful with single system environments, and/or logically partitioned environments, in which one or more of the partitions of a node includes an operating system instance. Again, all of these variations are considered a part of the claimed invention.

Entities of one or more nodes of a computing environment communicate with one another in order to perform certain tasks. These entities include, for instance, operating system images; and/or applications, such as user applications. During this communication, one entity sends a message to another entity requesting the other entity to perform a particular task. For example, Entity A sends a message to Entity B (on the same or different node) requesting Entity B to, for instance, invoke a function, store data, and/or get data. In order for Entity B to properly perform the task, Entity B needs to know the one or more addresses (e.g., virtual or real addresses) associated with the task.

In the past, these addresses were provided in the message. However, this caused difficulties in those situations in which the entity sending the message (e.g., Entity A) did not know the appropriate addresses of the receiving entity (e.g., Entity B). This is particularly troublesome for those environments that use one-sided communications protocols and/or do not have shared storage.

Thus, in accordance with an aspect of the present invention, communication between different entities is facilitated by the use of logical addresses, which are mapped to the appropriate addresses needed by the receiving entity. That is, the message sent by the sending entity includes one or more logical addresses, which are mapped to one or more non-logical addresses (e.g., virtual or real addresses) by the receiving entity. This is described in further detail with reference to FIGS. 2 and 3.

Figure 2:
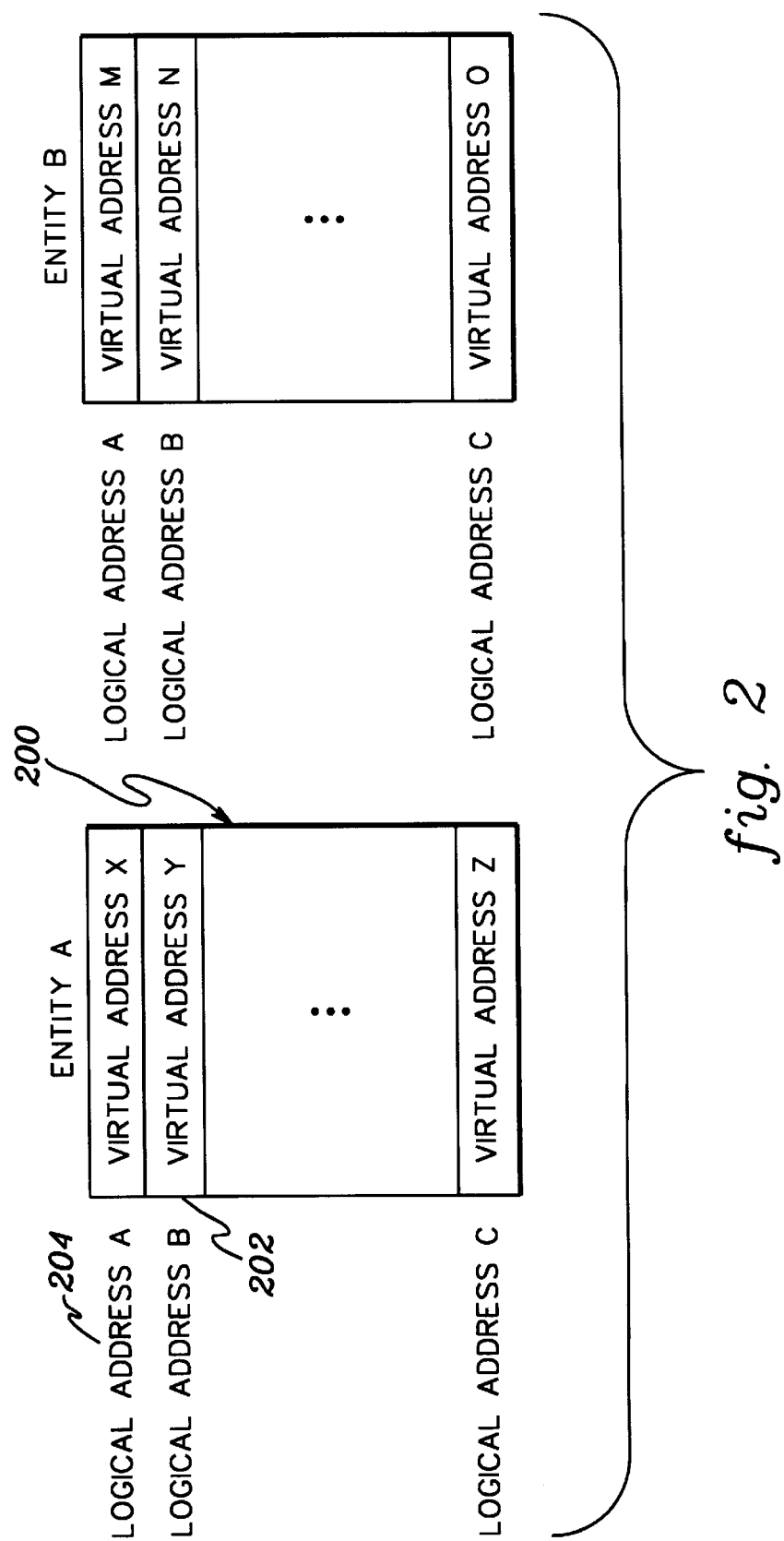
FIG. 2 illustrates a mapping of logical addresses to a plurality of virtual addresses, in accordance with an aspect of the present invention.

Referring initially to FIG. 2, it is shown that associated with each entity of the computing environment using the address mapping capability is an address mapping table 200. For example, assume that the entities are operating system images executing on either the same or different nodes. Then, each operating system image has associated therewith an address mapping table 200.

Each address mapping table includes one or more entries 202, and each entry includes a virtual address. Each virtual address in the table corresponds to a logical address 204, which is used as an index into the table. In one example, logical addresses are low order addresses that are not typically used for addressing. That is, in one example, the logical addresses are addresses below a certain address in the entity's address space typically used for addressing (e.g., addresses below 10,000).

The table is loaded, for instance, during initialization of the entity. The addresses loaded are those addresses that the entity wishes to use during communication with other entities. Agreement is made during, for example, the design stage, that indicates that a particular table entry associated with a particular logical address is to represent certain information. For example, entry #1 corresponding to Logical Address A includes a pointer (e.g., a virtual address) to a function, Function A. Similarly, entry #2 corresponding to Logical Address B includes, for instance, a data pointer (e.g., a virtual address) to a data location, etc. While each table entry corresponds to the same information, the pointers to that information may be different. That is, each logical address corresponds to a plurality of virtual addresses. Although, it is contemplated that the virtual addresses will typically be different from one another, they can be the same.

When an entity wishes to have a task performed and an address is to be used in the performance of the task, which is unknown to the entity, the entity uses, instead, the logical address associated with that task. The logical address has global meaning in the computing environment.

One embodiment of the logic associated with using logical addresses is described with reference to FIG. 3. In the particular example described with reference to FIG. 3, one operating system instance on one node (e.g., Entity A on Node A) is communicating with another operating system image on another node (e.g., Entity B on Node B) in order to have a task performed by Entity B (e.g., a function invoked). However, this is only one example. The one or more aspects of the invention are not limited to such an example. For instance, the entities can be other than operating system images, such as applications (e.g., user applications); the entities can be on the same node, instead of different nodes; and/or the task to be performed can be other than invoking a function. For instance, the message can be initiating the PUT/GET of data. Other variations are also possible.

Figure 3:
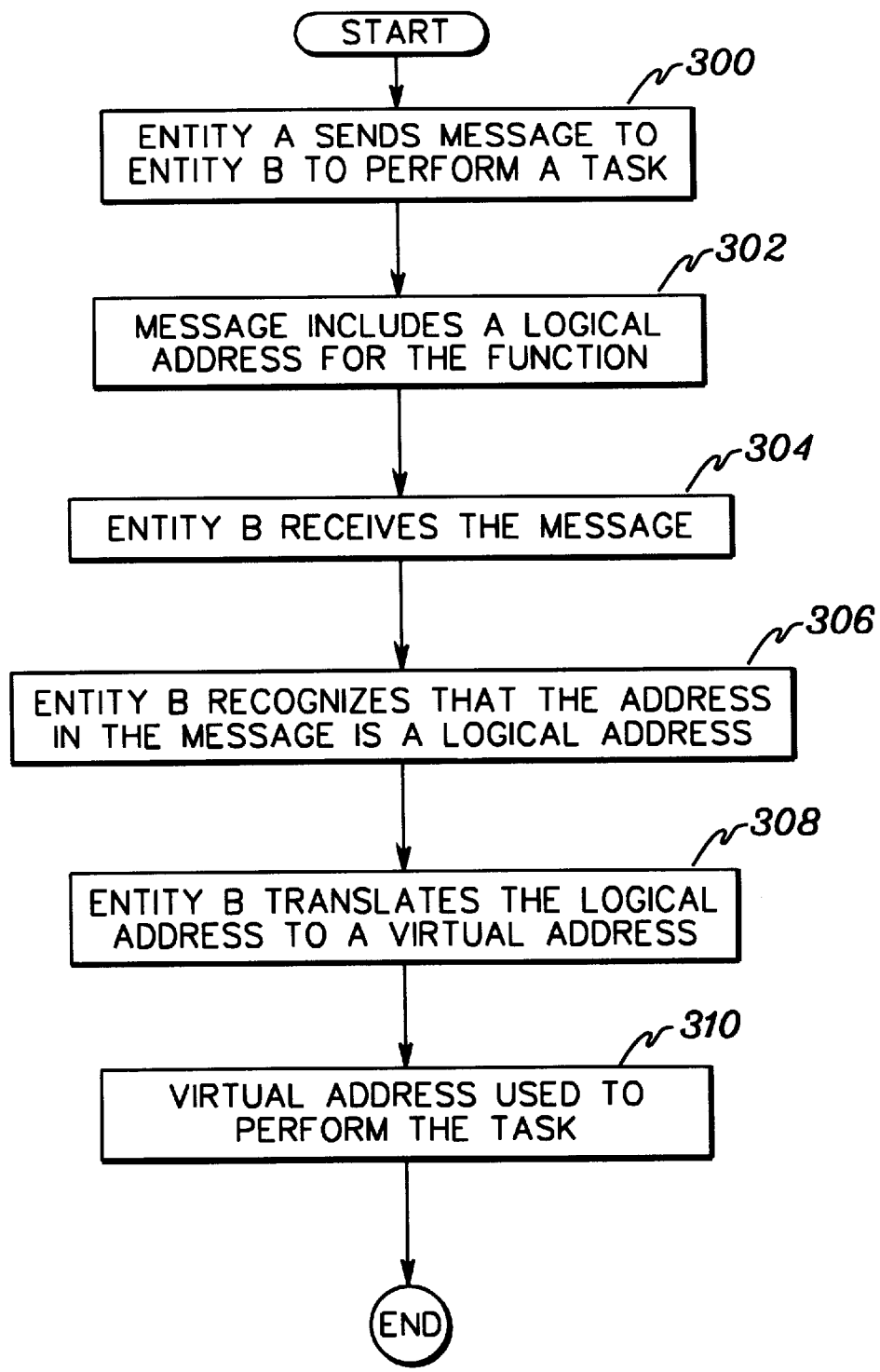
FIG. 3 depicts one embodiment of the logic associated with using an address mapping technique, in accordance with an aspect of the present invention.

Referring to FIG. 3, in one embodiment, Entity A on Node A sends a message to Entity B on Node B requesting that a task be performed, STEP 300. As one example, the task is the invocation by Entity B of a function, Function C. However, Entity A is unaware of the location of Function C on Node B. That is, Entity A does not have a virtual or real address for Function C on Entity B.

Thus, in order to facilitate communications between Entity A and Entity B, the message sent from Entity A includes a logical address for the desired function, STEP 302. This logical address maps to one virtual address for Entity A, but to another virtual address for Entity B (in this example).

When Entity B receives the message, STEP 304, Entity B recognizes that the address in the message is a logical address, STEP 306. As one example, it is the communications protocol (e.g., LAPI) associated with the entity that makes this recognition. (In other embodiments, it may be a different component of the entity. As used herein, a component may be included within or associated with the entity.) Such a recognition is made by, for instance, determining that the address is a low order address not typically used for virtual addresses.

Thus, Entity B, (e.g., the communications protocol or another component of Entity B) translates the logical address to a non-logical (e.g., a virtual) address, STEP 308. This translation is performed using an address mapping table (FIG. 2), in which the logical address is an index into the table. At the indexed location, a non-logical address is obtained. In this example, the non-logical address is a virtual address, which is used to perform the task (e.g., invoke the function), STEP 310. (In one embodiment, the virtual address may be translated to a real address, which is ultimately used to perform the task. Such a translation is performed at the node performing the task, and is known in the art.)

Described in detail above is an address mapping capability, which utilizes mapping tables to map a logical address to a plurality of non-logical addresses. In the example presented herein, each table takes up some portion of the sending (e.g., source) and receiving (e.g., target) entities address spaces. The logical address corresponds to a slot in the table and is used as a proxy for the actual virtual address. Thus, the indices of the table are treated as logical addresses by the application using the communication subsystem and are automatically replaced by the appropriate virtual addresses when they are referenced. (The term indices is used herein, for instance, as a direct mechanism to jump to in a table, or as an indirect mechanism with an associative lookup to find the indexed item. In the latter case, a table may have a column for logical addresses and a column for virtual addresses, and each row of the table gives a mapping of logical to virtual.)

Interfaces are provided to add/access entries in the table locally. That is, each table is maintained locally (i.e., at or on behalf of an entity without communication with the other entities).

In the examples described herein, a particular logical address corresponds to two non-logical addresses. However, in other examples, the logical address corresponds to more than two non-logical addresses. For example, each entity of the computing environment (or some portion of the entities) has a table in which the particular logical address maps to a non-logical address of that table. Notwithstanding the above, however, there is no requirement that all of the tables have all of the same logical addresses.

In accordance with a further aspect of the present invention, an application programming interface is provided to access a specified mapping table (e.g., a table on another node), in order to obtain a desired virtual address. For example, a GET message is used to fetch the address in the table at a specified index (i.e., logical address). This enables the entity issuing the GET message to use the virtual address in subsequent calls (e.g., other communication calls). The semantics of one or mores aspects of the present invention support both local SET and GET of the addresses in the table, as well as remote SET and GET of the addresses.

Advantageously, one or more aspects of the present invention facilitate communication between entities of a computing environment. For example, addresses can be shared across entities in different address spaces, in the absence of shared storage. Further, global synchronization is also avoided.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of mapping addresses, said method comprising:

specifying a logical address, said logical address corresponding to a first non-logical address; and mapping the logical address to a second non- logical address, wherein the logical address corresponds to a plurality of non-logical addresses, and wherein the correspondence of the logical and non-logical addresses is pre-determined by a user.

2. The method of claim 1, wherein the first non-logical address is different than the second non-logical address.

3. The method of claim 1, wherein said specifying comprises sending a message including the logical address from a first entity of a computing environment to a second entity of the computing environment, and wherein the mapping is performed using a component of the second entity.

4. The method of claim 3, wherein the component comprises a communications protocol.

5. The method of claim 3, wherein said message comprises a task to be executed, at least in part by the second entity, said task being associated with the logical address.

6. The method of claim 5, wherein the mapping is performed to facilitate execution of the task.

7. The method of claim 1, wherein the first non-logical address is associated with a first entity, and wherein the second non-logical address is associated with a second entity.

8. The method of claim 7, wherein the first entity is executing on a first node of a computing environment, and the second entity is executing on a second node of the computing environment.

9. The method of claim 8, wherein the first node and the second node are different nodes.

10. The method of claim 8, wherein the first node and the second node are the same nodes.

11. The method of claim 7, wherein the first entity is a first operating system instance, and wherein the second entity is a second operating system instance.

12. The method of claim 7, wherein the first entity is a first application, and wherein the second entity is a second application.

13. The method of claim 1, wherein the mapping comprises using the logical address as an index into an address mapping table to obtain the second non-logical address.

14. The method of claim 1, wherein at least one of the first non-logical address and the second non-logical address is a virtual address.

15. A method of mapping addresses, said method comprising:
  receiving, by one entity of a computing environment from another entity of the computing environment, a message having a logical address, the logical address corresponding to a non-logical address usable by the one entity that is unknown to the another entity, the correspondence of the logical and non-logical addresses being pre-determined by a user; and
  translating the logical address to the non- logical address usable by the one entity.

16. The method of claim 15, wherein the translating comprises using the logical address as an index into an address mapping table of the one entity to determine the non-logical address.

17. The method of claim 16, wherein the translating is performed by a component of the one entity.

18. The method of claim 15, wherein the logical address corresponds to another non-logical address, said another non-logical address being associated with said another entity.

19. The method of claim 15, wherein the one entity and the another entity are on different nodes of the computing environment.

20. The method of claim 15, wherein the one entity comprises an operating system image on one node of the computing environment, and the another entity comprises another operating system image on the same node or a different node of the computing environment.

21. The method of claim 15, wherein the one entity comprises an application executing on one node of the computing environment, and the another entity comprises another application executing on a different node of the computing environment.

22. A method of mapping addresses, said method comprising:
  sending, from one operating system instance to another operating system instance, a message indicating a task to be performed, said message including a logical address associated with said task;
  determining, by a component of the another operating system instance, a non-logical address corresponding to the logical address, the correspondence of the logical and non-logical addresses being pre-determined by a user; and
  using the non-logical address by the another operating system instance to facilitate execution of the task.

23. The method of claim 22, wherein the one operating system instance is unaware of addressing of the another operating system instance.

24. The method of claim 22, wherein the first operating system instance and the second operating system instance are executing on separate nodes.

25. The method of claim 22, wherein the first operating system instance and the second operating system instance are executing on the same node.

26. The method of claim 22, wherein the determining comprises using the logical address as an index into an address mapping table to obtain the non-logical address.

27. The method of claim 26, wherein the address mapping table is local to the another operating system instance.

28. The method of claim 22, wherein the logical address corresponds to another non-logical address, the another non-logical address being associated with said one operating system instance.

29. A system of mapping addresses, said system comprising:
  means for specifying a logical address, said logical address corresponding to a first non-logical address; and
  means for mapping the logical address to a second non-logical address, wherein the logical address corresponds to a plurality of non-logical addresses, the correspondence of the logical and non-logical addresses being pre-determined by a user.

30. The system of claim 29, wherein the first non-logical address is different than the second non-logical address.

31. The system of claim 29, wherein said means for specifying comprises means for sending a message including the logical address from a first entity of a computing environment to a second entity of the computing environment, and wherein the means for mapping comprises a component of the second entity.

32. The system of claim 31, wherein the component comprises a communications protocol.

33. The system of claim 31, wherein said message comprises a task to be executed, at least in part by the second entity, said task being associated with the logical address.

34. The system of claim 33, wherein the mapping is performed to facilitate execution of the task.

35. The system of claim 29, wherein the first non-logical address is associated with a first entity, and wherein the second non-logical address is associated with a second entity.

36. The system of claim 35, wherein the first entity is executing on a first node of a computing environment, and the second entity is executing on a second node of the computing environment.

37. The system of claim 36, wherein the first node and the second node are different nodes.

38. The system of claim 36, wherein the first node and the second node are the same nodes.

39. The system of claim 35, wherein the first entity is a first operating system instance, and wherein the second entity is a second operating system instance.

40. The system of claim 35, wherein the first entity is a first application, and wherein the second entity is a second application.

41. The system of claim 29, wherein the means for mapping comprises means for using the logical address as an index into an address mapping table to obtain the second non-logical address.

42. The system of claim 29, wherein at least one of the first non-logical address and the second non-logical address is a virtual address.

43. A system of mapping addresses, said system comprising:
   means for receiving, by one entity of a computing environment from another entity of the computing environment, a message having a logical address, the logical address corresponding to a non-logical address usable by the one entity that is unknown to the another entity, the correspondence of the logical and non-logical addresses being pre-determined by a user; and
   means for translating the logical address to the non-logical address usable by the one entity.

44. The system of claim 43, wherein the means for translating comprises means for using the logical address as an index into an address mapping table of the one entity to determine the non-logical address.

45. The system of claim 44, wherein the means for translating comprises a component of the one entity.

46. The system of claim 43, wherein the logical address corresponds to another non-logical address, said another non-logical address being associated with said another entity.

47. The system of claim 43, wherein the one entity and the another entity are on different nodes of the computing environment.

48. The system of claim 43, wherein the one entity comprises an operating system image on one node of the computing environment, and the another entity comprises another operating system image on the same node or a different node of the computing environment.

49. The system of claim 43, wherein the one entity comprises an application executing on one node of the computing environment, and the another entity comprises another application executing on a different node of the computing environment.

50. A system of mapping addresses, said system comprising:
   means for sending, from one operating system instance to another operating system instance, a message indicating a task to be performed, said message including a logical address associated with said task;
   means for determining, by a component of the another operating system instance, a non-logical address corresponding to the logical address, the correspondence of the logical and non-logical addresses being pre-determined by a user; and
   means for using the non-logical address by the another operating system instance to facilitate execution of the task.

51. The system of claim 50, wherein the one operating system instance is unaware of addressing of the another operating system instance.

52. The system of claim 50, wherein the first operating system instance and the second operating system instance are executing on separate nodes.

53. The system of claim 50, wherein the first operating system instance and the second operating system instance are executing on the same node.

54. The system of claim 50, wherein the means for determining comprises means for using the logical address as an index into an address mapping table to obtain the non-logical address.

55. The system of claim 54, wherein the address mapping table is local to the another operating system instance.

56. The system of claim 50, wherein the logical address corresponds to another non-logical address, the another non-logical address being associated with said one operating system instance.

57. A system of mapping addresses, said system comprising:
   a logical address, said logical address corresponding to a first non-logical address; and
   a component to map the logical address to a second non-logical address, wherein the logical address corresponds to a plurality of non-logical addresses, and wherein the correspondence of the logical and non-logical addresses is pre-determined by a user.

58. A system of mapping addresses, said system comprising:
   one entity of a computing environment to receive from another entity of the computing environment a message having a logical address, the logical address corresponding to a non-logical address usable by the one entity that is unknown to the another entity, the correspondence of the logical and non-logical addresses being pre-determined by a user; and
   a component of the one entity to translate the logical address to the non-logical address usable by the one entity.

59. A system of mapping addresses, said system comprising:
   one operating system instance to send to another operating system instance a message indicating a task to be performed, said message including a logical address associated with said task; and
   a component of the another operating system instance to determine a non-logical address corresponding to the logical address, wherein the correspondence of the logical and non-logical addresses is pre-determined by a user, and wherein the non-logical address is usable by the another operating system instance to facilitate execution of the task.

60. At least one program storage device readable by a machine, tangibly embodying at least one program of instructions executable by the machine to perform a method of mapping addresses, said method comprising:
   specifying a logical address, said logical address corresponding to a first non-logical address, the correspondence of the logical and non-logical addresses being pre-determined by a user; and
   mapping the logical address to a second non-logical address, wherein the logical address corresponds to a plurality of non-logical addresses.

61. The at least one program storage device of claim 60, wherein the first non-logical address is different than the second non-logical address.

62. The at least one program storage device of claim 60, wherein said specifying comprises sending a message including the logical address from a first entity of a computing environment to a second entity of the computing environment, and wherein the mapping is performed using a component of the second entity.

63. The at least one program storage device of claim 62, wherein the component comprises a communications protocol.

64. The at least one program storage device of claim 62, wherein said message comprises a task to be executed, at least in part by the second entity, said task being associated with the logical address.

65. The at least one program storage device of claim 64, wherein the mapping is performed to facilitate execution of the task.

66. The at least one program storage device of claim 60, wherein the first non-logical address is associated with a first entity, and wherein the second non-logical address is associated with a second entity.

67. The at least one program storage device of claim 66, wherein the first entity is executing on a first node of a computing environment, and the second entity is executing on a second node of the computing environment.

68. The at least one program storage device of claim 67, wherein the first node and the second node are different nodes.

69. The at least one program storage device of claim 67, wherein the first node and the second node are the same nodes.

70. The at least one program storage device of claim 66, wherein the first entity is a first operating system instance, and wherein the second entity is a second operating system instance.

71. The at least one program storage device of claim 66, wherein the first entity is a first application, and wherein the second entity is a second application.

72. The at least one program storage device of claim 60, wherein the mapping comprises using the logical address as an index into an address mapping table to obtain the second non-logical address.

73. The at least one program storage device of claim 60, wherein at least one of the first non-logical address and the second non-logical address is a virtual address.

74. At least one program storage device readable by a machine, tangibly embodying at least one program of instructions executable by the machine to perform a method of mapping addresses, said method comprising:

receiving, by one entity of a computing environment from another entity of the computing environment, a message having a logical address, the logical address corresponding to a non-logical address usable by the one entity that is unknown to the another entity, the correspondence of the logical and non-logical addresses being pre-determined by a user; and translating the logical address to the non-logical address usable by the one entity.

75. The at least one program storage device of claim 74, wherein the translating comprises using the logical address as an index into an address mapping table of the one entity to determine the non-logical address.

76. The at least one program storage device of claim 75, wherein the translating is performed by a component of the one entity.

77. The at least one program storage device of claim 74, wherein the logical address corresponds to another non-logical address, said another non-logical address being associated with said another entity.

78. The at least one program storage device of claim 74, wherein the one entity and the another entity are on different nodes of the computing environment.

79. The at least one program storage device of claim 74, wherein the one entity comprises an operating system image on one node of the computing environment, and the another entity comprises another operating system image on the same node or a different node of the computing environment.

80. The at least one program storage device of claim 74, wherein the one entity comprises an application executing on one node of the computing environment, and the another entity comprises another application executing on a different node of the computing environment.

81. At least one program storage device readable by a machine, tangibly embodying at least one program of instructions executable by the machine to perform a method of mapping addresses, said method comprising:

sending, from one operating system instance to another operating system instance, a message indicating a task to be performed, said message including a logical address associated with said task;

determining, by a component of the another operating system instance, a non-logical address corresponding to the logical address, the correspondence of the logical and non-logical addresses being pre-determined by a user; and using the non-logical address by the another operating system instance to facilitate execution of the task.

82. The at least one program storage device of claim 81, wherein the one operating system instance is unaware of addressing of the another operating system instance.

83. The at least one program storage device of claim 81, wherein the first operating system instance and the second operating system instance are executing on separate nodes.

84. The at least one program storage device of claim 81, wherein the first operating system instance and the second operating system instance are executing on the same node.

85. The at least one program storage device of claim 81, wherein the determining comprises using the logical address as an index into an address mapping table to obtain the non-logical address.

86. The at least one program storage device of claim 85, wherein the address mapping table is local to the another operating system instance.

87. The at least one program storage device of claim 81, wherein the logical address corresponds to another non-logical address, the another non-logical address being associated with said one operating system instance.

\* \* \* \* \*

UNITED STATES PATENT AND TRADEMARK OFFICE
CERTIFICATE OF CORRECTION

PATENT NO.    : 6,782,464 B2
DATED         : August 24, 2004
INVENTOR(S)   : Blackmore et al.

It is certified that error appears in the above-identified patent and that said Letters Patent is hereby corrected as shown below:

Title page,
Item [54], Title, delete "MAPPING A LOGICAL ADDRESS TO A PLURALITY ON NON-LOGICAL ADDRESSES" and insert -- MAPPING A LOGICAL ADDRESS TO A PLURALITY OF NON-LOGICAL ADDRESSES --

Signed and Sealed this

Twelfth Day of October, 2004

JON W. DUDAS
*Director of the United States Patent and Trademark Office*